United States Patent Office 3,420,834
Patented Jan. 7, 1969

1

3,420,834
2,3-DIMETHOXY-BERBINES SUBSTITUTED IN THE 10 POSITION AND PROCESS
Georges Muller, Nogent-sur-Marne, and André Poittevin, Les Lilas, France, assignors to Roussel UCLAF, Paris, France, a corporation of France
No Drawing. Continuation-in-part of application Ser. No. 506,117, Nov. 2, 1965. This application Nov. 24, 1967, Ser. No. 685,333
Claims priority, application France, Nov. 13, 1964, 994,- 859; Feb. 11, 1965, 5,222; Feb. 12, 1965, 5,388; Oct. 11, 1965, 34,493
U.S. Cl. 260—287          21 Claims
Int. Cl. C07d 33/00; C07d 35/00; C07d 33/38

ABSTRACT OF THE DISCLOSURE

The present invention relates to berbine derivatives of the formula

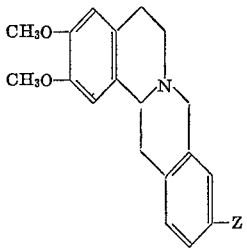

wherein Z is selected from the group consisting of

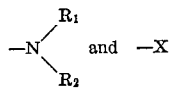

wherein $R_1$ is selected from the group consisting of hydrogen and alkyl having from 1 to 6 carbon atoms, $R_2$ is selected from the group consisting of hydrogen, alkyl having from 1 to 6 carbon atoms and an acyl of an organic carboxylic acid having from 1 to 12 carbon atoms, and X is selected from the group consisting of halogen having an atomic weight greater than 19, —C≡N and —COOR$_1$, said compounds occurring in racemic or optically active form, and their salts. The invention also relates to a process for the preparation of these compounds.

These compounds are noteworthy due to their interesting tranquilizing properties.

---

This application is a continuation-in-part of our copending patent application Ser. No. 506,117, filed Nov. 2, 1965, now abandoned.

The right of priority, under the provisions of 35 USC 119, is hereby claimed based on the corresponding French patent applications P.V. 994,859, filed Nov. 13, 1964, P.V. 5,222, filed Feb. 11, 1965, P.V. 5,388, filed Feb. 12, 1965 and P.V. 34,493, filed Oct. 11, 1965, on our behalf.

2

*Objects of the invention*

An object of the present invention is the obtention of a berbine compound selected from the group consisting of a berbine derivative of the formula

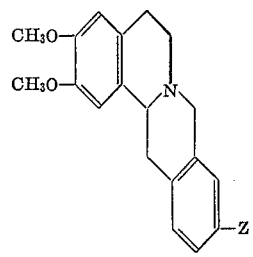

wherein Z is selected from the group consisting of

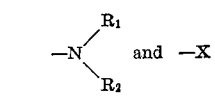

wherein $R_1$ is selected from the group consisting of hydrogen and alkyl having from 1 to 6 carbon atoms, $R_2$ is selected from the group consisting of hydrogen, alkyl having from 1 to 6 carbon atoms and an acyl of an organic carboxylic acid having from 1 to 12 carbon atoms, and X is selected from the group consisting of halogen, having an atomic weight greater than 19, —C≡N and —COOR$_1$; its levorotatory and dextrorotatory enantiomorphs; and its pharmaceutically acceptable acid addition salts.

These compounds are noteworthy due to their interesting tranquilizing properties.

Among the products obtained, the following compounds exhibit a particular significance:

2,3-dimethoxy-10-amino-berbine (Z=—NH$_2$)
2,3-dimethoxy-10-methylamino-berbine (Z=—NCH$_3$)
2,3-dimethoxy-10-ethylamino-berbine (Z=—NHC$_2$H$_5$)

2,3-dimethoxy-10-dimethylamino-berbine $\left( Z=-N\begin{matrix}CH_3\\CH_3\end{matrix} \right)$ 2,3-dimethoxy-10-diethylamino-berbine $\left( Z=-N\begin{matrix}C_2H_5\\C_2H_5\end{matrix} \right)$ 2,3-dimethoxy-10-acetylamino-berbine (Z=—NHCOCH$_3$)
2,3-dimethoxy-10-formylamino-berbine (Z=—NHCOH)

2,3-dimethoxy-10-N-acetyl-N-ethyl-amino-berbine $\left( Z=-N\begin{matrix}C_2H_5\\COCH_3\end{matrix} \right)$ 2,3-dimethoxy-10-chloro-berbine (Z=—Cl)
2,3-dimethoxy-10-carboxy-berbine (Z=—COOH)
2,3-dimethoxy-10-cyano-berbine (Z=—CN)

Another object of the present invention is the development of a process for the production of a berbine compound selected from the group consisting of a berbine derivative of the formula

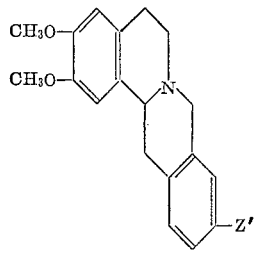

wherein Z' is a member selected from the group consisting of

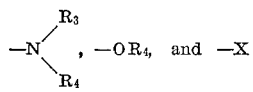

wherein $R_4$ is selected from the group consisting of hydrogen, alkyl having from 1 to 6 carbon atoms and an acyl radical of an organic carboxylic acid having from 1 to 12 carbon atoms, $R_3$ is selected from the group consisting of hydrogen and alkyl having from 1 to 6 carbon atoms and X is selected from the group consisting of halogen having an atomic weight greater than 19, —C≡N and —COOR$_3$; its levorotatory and dextrorotatory enantiomorphs; and its pharmaceutically acceptable acid addition salts, which comprises the steps of:

(a) Condensing 4-nitro-homophthalic acid anhydride with 3,4-dimethoxy-phenethylamine in the presence of an organic solvent, (b) Esterifying the carboxyl of the resulting 2-carboxy-4-nitro-N-[β-(3',4'-dimethoxyphenyl)-ethyl]-phenylacetamide with a lower alkyl under esterifying conditions, (c) Cyclizing the resulting 2-carbo-lower-alkoxy-4-nitro-N-[β-(3',4'-dimethoxyphenyl)-ethyl]-phenylacetamide by treatment with phosphorus oxychloride, (d) Reducing the resulting 2,3-dimethoxy-8-oxo-10-nitro-13-dehydro-berbine by treatment with lithium-aluminum hydride in the presence of an aluminum halide in an organic solvent, (e) Reducing the double bond in the 13 position of the resulting 2,3-dimethoxy-10-amino-13-dehydro-berbine by treatment with an alkali metal borohydride in an aqueous alkanolic media, and (f) Recovering said berbine compound.

A further object of the invention is the development of a process for the production of a berbine compound selected from the group consisting of a berbine derivative of the formula

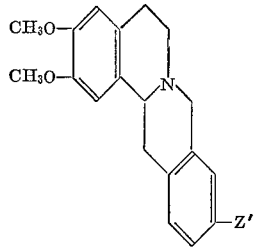

wherein Z' is a member selected from the group consisting of

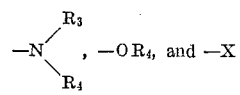

wherein $R_4$ is selected from the group consisting of hydrogen, alkyl having from 1 to 6 carbon atoms and an acyl radical of an organic carboxylic acid having from 1 to 12 carbon atoms, $R_3$ is selected from the group consisting of hydrogen and alkyl having from 1 to 6 carbon atoms and X is selected from the group consisting of a halogen having an atomic weight greater than 19, —C≡N and —COOR$_3$; its levorotatory and dextrorotatory enantiomorphs; and its pharmaceutically acceptable acid salts, which comprises the steps of:

(a) Condensing 4-nitro-homophthalic acid anhydride with 3,4-dimethoxy-phenethylamine in the presence of an organic solvent, (b) Esterifying the carboxyl of the resulting 2-carboxy-4-nitro-N-[β-(3,4'-dimethoxyphenyl)-ethyl]-phenylacetamide with a lower alkyl under esterifying conditions, (c) Reducing the ester group of the resulting 2-carbo-lower-alkoxy-4-nitro-N-[β-(3',4'-dimethoxy-phenyl)-ethyl]-phenylacetamide by treatment with an alkali metal borohydride in the presence of a lithium halide and an organic solvent, (d) Cyclizing the resulting 2-hydroxymethyl-4-nitro-N-[β-(3',4'-dimethoxy-phenyl)-ethyl]-phenylacetamide by treatment with phosphorus oxychloride, (e) Reducing the resulting resin by treatment with an alkali metal borohydride in an aqueous alkanolic media, (f) Reducing the resulting 2,3-dimethoxy-10-nitro-berbine by treatment with a reducing metal selected from the group consisting of zinc and iron, in an acidic media, and (g) Recovering said berbine compound.

A still further object of the present invention is the obtention of the intermediate compounds:

(a) 2-carboxy-4-nitro-N-[β-(3',4'-dimethoxyphenyl)-ethyl]-phenylacetamide, (b) 2-carbo-lower-alkoxy-4-nitro-N-[β-(3',4'-dimethoxy-phenyl)-ethyl]-phenylacetamide, (c) 2,3-dimethoxy-8-oxo-10-nitro-13-dehydro-berbine, (d) 2,3-dimethoxy-10-amino-13-dehydro-berbine, (e) 2-hydroxymethyl-4-nitro-N-[β-(3',4'-dimethoxyphenyl)-ethyl]-phenylacetamide, (f) 2,3-dimethoxy-10-nitro-berbine.

A yet further object of the invention is the development of a process for tranquilizing and/or effecting analgesia in warm-blooded animals which comprises administering to said warm-blooded animals a daily safe, but effective, dose of between about 1 mg./kg. to about 35 mg./kg. of body weight, of a berbine compound selected from the group consisting of a berbine derivative of the formula

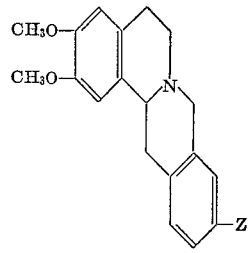

wherein Z is selected from the group consisting of

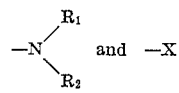

wherein $R_1$ is selected from the group consisting of hydrogen and alkyl having from 1 to 6 carbon atoms, $R_2$ is selected from the group consisting of hydrogen, alkyl having from 1 to 6 carbon atoms and an acyl of an organic carboxylic acid having from 1 to 12 carbon atoms, and X is selected from the group consisting of halogen having an atomic weight greater than 19, —C≡N and —COOR$_1$; its levorotatory and dextrorotatory enantiomorphs; and its pharmaceutically acceptable acid addition salts.

These and other objects of the present invention will become more apparent as the description thereof proceeds.

Description of the invention

We have now discovered a novel class of berbine compounds selected from the group consisting of a berbine derivative of the formula

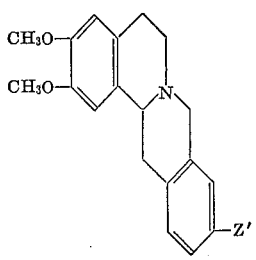

wherein Z is selected from the group consisting of

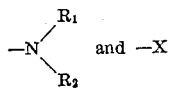

wherein $R_1$ is selected from the group consisting of hydrogen and alkyl having from 1 to 6 carbon atoms, $R_2$ is selected from the group consisting of hydrogen, alkyl having from 1 to 6 carbon atoms and an acyl of an organic carboxylic acid having from 1 to 12 carbon atoms, and X is selected from the group consisting of halogen having an atomic weight greater than 19, $-C \equiv N$ and $-COOR_1$; its levorotatory and dextrorotatary enantiomorphs; and its pharmaceutically acceptable acid addition salts; which compounds are useful for their tranquilizing properties.

The actually preferred process for the preparation of these compounds of the above class as well as 2,3-dimethoxy-berbine compounds of the general Formula I

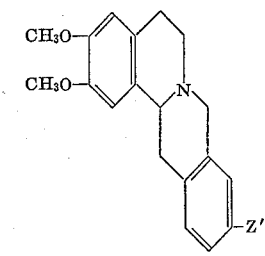

wherein Z′ is a member selected from the group consisting of

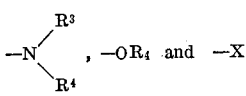

wherein $R_4$ is selected from the group consisting of hydrogen, alkyl having from 1 to 6 carbon atoms and an acyl of an organic carboxylic acid having from 1 to 12 carbon atoms, $R_3$ is selected from the group consisting of hydrogen and alkyl having from 1 to 6 carbon atoms, and X is selected from the group consisting of halogen having an atomic weight greater than 19, $-C \equiv N$ and $-COOR_3$; is represented by the series of reactions in Table I.

*Table I*

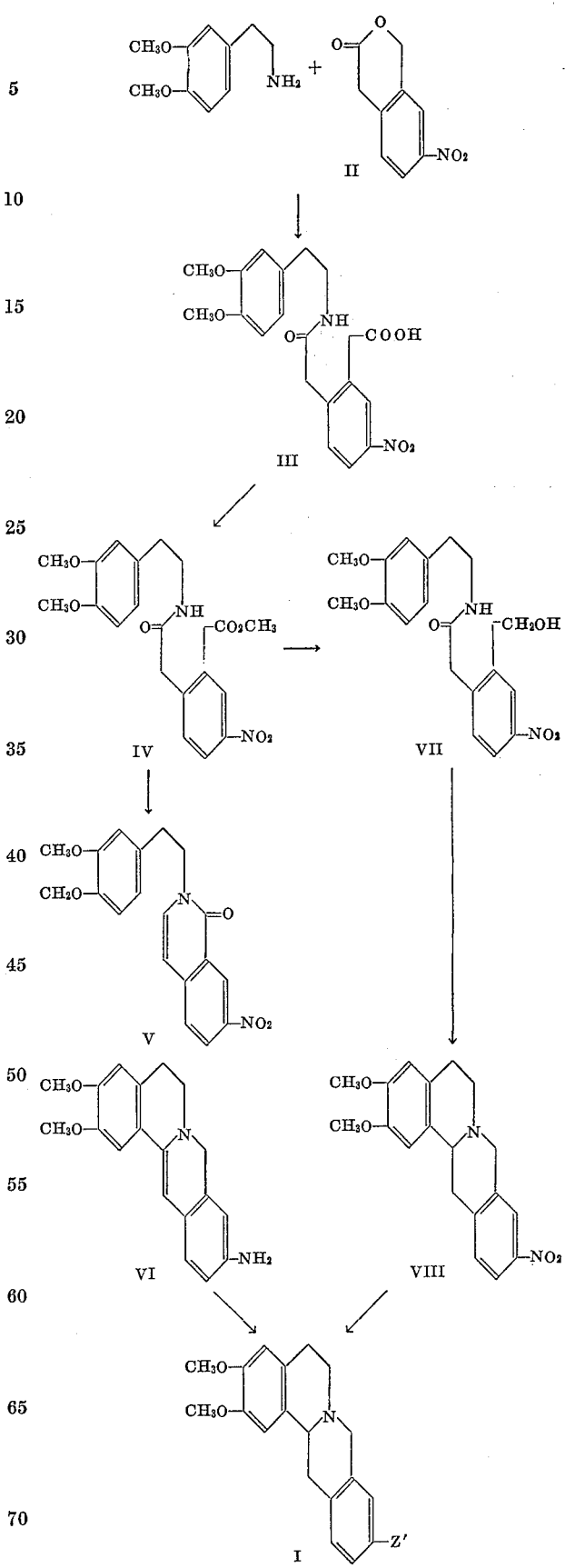

wherein Z′ has the above-indicated significance.

This process is characterized in that 4-nitro-homophthalic acid anhydride, II, is condensed with 3,4-dimethoxy-phenethylamine to obtain 2-carboxy-4-nitro-N-[β - (3',4, - dimethoxy - phenyl)-ethyl]-phenylacetamide, III. The acid function of compound III is esterified with a lower alkyl, particularly the methyl to give compound IV. The esterified product IV is cyclized with the aid of phosphorus oxychloride into 2,3-dimethoxy-8-oxo-10-nitro-13-dehydro-berbine, V. This latter compound is subjected to the action of lithium-aluminum hydride in the presence of an aluminum halide such as aluminum chloride or aluminum bromide, thus obtaining 2,3-dimethoxy-10-amino-13-dehydro-berbine, VI. The double bond in the 13 position of compound VI is reduced with the aid of an alkali metal borohydride in an aqueous alkanolic media and the 2,3-dimethoxy-10-amino-berbine (I, Z'=—NH$_2$) obtained in this manner is converted into other desired derivatives of the Formula I.

A modification of the process described in the preceding is characterized in that 2-carbo-lower-alkoxy-4-nitro-N - [β - (3',4' - dimethoxy-phenyl)-ethyl]-phenylacetamide is subjected to a selective reduction of the ester function with the aid of an alkali metal borohydride in the presence of a lithium salt such as lithium halide. The resultant 2 - hydroxymethyl - 4-nitro-N-[β-(3',4'-dimethoxy - phenyl)-ethyl]-phenylacetamide, VII, is treated first with phosphorus oxychloride, then with an alkali metal borohydride in an aqueous alkanolic media, to obtain 2,3-dimethoxy-10-nitro-berbine, VIII, which is reduced into the compound I with (Z'=—NH$_2$), by treatment with a metal reducing agent such as zinc or iron, in an acidic media.

The subsequent conversions of 2,3-dimethoxy-10-amino-berbine, compound I (Z'=—NH$_2$), into other derivatives of the general Formula I was effected in the following manner:

(1) 2,3 - dimethoxy - 10 - di-lower-alkyl-amino-berbine, preferably 2,3 - dimethoxy-10-dimethylamino-berbine

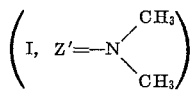

is obtained from 2,3-dimethoxy-10-amino-berbine by the reaction of a lower alkanol, such as formaldehyde in the presence of acetic acid.

(2) 2,3 - dimethoxy - 10 - acylamino-berbine, preferable 2,3-dimethoxy-10-acetylamino-berbine (I, Z'=—NH—COCH$_3$)

or 2,3-dimethoxy-10-formylamino-berbine (I, Z'=—NH—COH)

is obtained from 2,3-dimethoxy-10-amino-berbine by the reaction of an organic carboxylic acid anhydride or formic acid, such as acetic acid anhydride in the presence of pyridine or formic acid at reflux.

(3) 2,3-dimethoxy-10-hydroxy-berbine (I, Z'=—OH)

is obtained from 2,3-dimethoxy-10-amino-berbine by the action of nitrous acid.

(4) 2,3 - dimethoxy - 10 - lower-alkoxy-berbine (I, Z'=—O-lower-alkyl), such as 2,3,10-trimethoxy-berbine, is obtained by reaction of 2,3-dimethoxy-10-hydroxy-berbine with the desired lower alkanol in the presence of silver oxide or silver carbonate, and in the case of preparation of the methyl ether, by reaction with diazomethane.

(5) The organic carboxylic acid esters having from 1 to 12 carbon atoms in the acyl radical of 2,3-dimethoxy-10-hydroxy-berbine (I, Z'=—O-acyl), are obtained by reaction of 2,3-dimethoxy-10-hydroxy-berbine with a functional derivative such as the acid anhydride or acid chloride of the acid selected.

(6) 2,3 - dimethoxy - 10 - halo-berbine, preferably 2,3 - dimethoxy-10-chloro-berbine (I, Z'=—Cl), is obtained from 2,3-dimethoxy-10-amino-berbine by action of nitrous acid followed by treatment with a cuprous halide, preferably cuprous chloride.

(7) 2,3 - dimethoxy - 10 - alkylamino-berbine, preferably 2,3-dimethoxy-10-methylamino-berbine (I, Z'=—NHC$_2$H$_5$)

is obtained from the corresponding 2,3-dimethoxy-10-acylamino-berbine by the reaction of a lithium metal hydride, such as lithium-aluminum hydride, in an organic solvent.

(8) 2,3 - dimethoxy - 10 - N-acyl-N-alkyl-amino-berbine, preferably 2,3 - dimethoxy - 10-N-acetyl-N-ethyl-amino-berbine

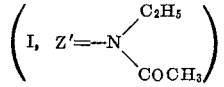

is obtained from the corresponding 2,3-dimethoxy-10-alkylamino-berbine by the same reactions as indicated in (2) above.

(9) 2,3 - dimethoxy - 10 - dialkylamino-berbine can also be obtained from the corresponding 2,3-dimethoxy-10-N-acyl-N-alkyl-amino-berbine by the same reactions as indicated in (7) above.

(10) 2,3-dimethoxy-10-cyano-berbine (I, Z'=—C≡N)

is obtained from 2,3-dimethoxy-10-amino-berbine by the action of nitrous acid, followed by the action of a cuprocyanide complex.

(11) 2,3 - dimethoy - 10 - carboxy - berbine (I, Z'=—COOH) is obtained from 2,3-dimethoxy-10-cyano-berbine by acid hydrolysis, preferably with concentrated hydrochloric acid.

(12) 2,3 - dimethoxy - 10 - carbalkoxy-berbine, preferably 2,3 - dimethoxy - 10-carbomethoxy-berbine (I, Z'=—COOCH$_3$), is obtained from 2,3 - dimethoxy-10-cyano-berbine by acid hydrolysis in the presence of a lower alkanol, such as methanol saturated with hydrochloric acid.

(13) 2,3 - dimethoxy - 10-carbalkoxy-berbine can also be obtained by conventional esterification of 2,3-dimethoxy-10-carboxy-berbine.

The execution of the process of the invention may also be characterized by the following preferred steps:

(a) The condensation of 4 - nitro-homophthalic acid anhydride, II, with 3,4 - dimethoxy-phenethylamine is accomplished in an organic solvent, preferably an aromatic hydrocarbon, such as benzene or toluene, at the reflux temperature of the solvent.

(b) The 2 - carboxy - 4-nitro-N-[β-(3',4'-dimethoxyphenyl)-ethyl]-phenylacetamide, III, is converted into its lower alkyl ester such as the methyl ester with the aid of a diazo-lower alkane, such as diazomethane by reaction in an organic solvent, such as methylene chloride.

(c) The 2-carboxy-4-nitro - N - [β - (3',4' - dimethoxyphenyl)-ethyl]-phenylacetamide, III, is converted into its lower alkyl ester, such as the methyl ester, with the aid of a lower alkanol, such as methanol, in the presence of an acid catalyst, for example, sulfuric acid.

(d) The cyclization of 2-carbo-lower-alkoxy-4-nitro-N-[β-(3',4'-dimethoxy-phenyl)-ethyl]-phenylacetamide, IV, preferably the 2-carbomethoxy derivative, with phosphorus oxychloride is effected at about room temperature and is followed by a treatment with ammonia.

(e) The reduction of 2,3-dimethoxy-8-oxo-10-nitro-13-dehydro-berbine, V, by lithium-aluminum hydride in the presence of an aluminum halide, such as aluminum chloride, is conducted in an organic solvent, such as tetrahydrofuran, and is carried out in two stages, first at about room temperature, then at the reflux temperature of the solvent.

(f) The reduction of the double bond in the 13 position of 3,4-dimethoxy-10-amino-13-dehydro-berbine, VI, is effected with an alkali metal borohydride, such as potassium borohydride in an aqueous alkanolic media, such as aqueous ethanol, at the reflux temperature of the solvent.

(g) The selective reduction of the ester function of 2-carbo-lower-alkoxy-4-nitro-N-[β-(3',4'-dimethoxyphenyl)-ethyl]-phenylacetamide, preferably 2-carbomethoxy-4-nitro-N-[β-(3',4'-dimethoxy-phenyl)-ethyl]-phenyl-acetamide, IV, is effected with the aid of an alkali metal borohydride, such as potassium borohydride in the presence of a lithium halide, such as lithium chloride, while working in an organic solvent, such as tetrahydrofuran at about room temperature.

(h) The cyclization of 2-hydroxymethyl-4-nitro-N-[β-(3',4'-dimethoxy-phenyl)-ethyl]-phenylacetamide, VII, is effected with phosphorus oxychloride in an organic solvent, at the reflux temperature, and by the subsequent treatment of the resin produced with an alkali metal borohydride, such as potassium borohydride in an aqueous alkanolic media, such as aqueous ethanol, at about room temperature.

(i) The reduction of 2,3-dimethoxy-10-nitro-berbine, VIII, with a reducing metal such as zinc or iron in an acidic media is preferably conducted with zinc under reflux in acetic acid.

(j) The alkylation of the nitrogen atom of the amino group of 2,3-dimethoxy-10-amino-berbine (I, Z'=NH$_2$), with a lower alkanol is preferably conducted with formaldehyde in the presence of zinc in acetic acid and is carried out at room temperature.

(k) The conversion of 2,3-dimethoxy-10-amino-berbine (I, Z'=—OH) into 2,3-dimethoxy-10-hydroxy-berbine is effected in hydrochloric acid by action of sodium nitrite to form nitrous acid.

(l) The conversion of 2,3-dimethoxy-10-hydroxy-berbine (I, Z'=—OH) into 2,3,10-trimethoxy-berbine (I, Z'=—OCH$_3$), is effected by the action of diazomethane in a methylene chloride-methanol mixture.

(m) The conversion of 2,3-dimethoxy-10-amino-berbine (I, Z'=—NH$_2$), into 2,3-dimethoxy-10-chloro-berbine (I, Z'=Cl), is effected by action of sodium nitrite in hydrochloric acid followed by reaction with cuprous chloride.

It should be understood that the invention is not limited to the processes described in the preceding, but it also includes the technical equivalents of these processes. For example, as such equivalents, the introduction into the future 10 position of the grouping desired may be made at the beginning of the synthesis, instead of proceeding in end to the conversion products mentioned above. Likewise, this synthesis could be carried out by starting with a homophthalic acid anhydride comprising, in particular, a dimethylamino group or a chlorine atom in the 4 position.

The following examples will serve for better comprehension of the invention. However, it is to be understood that they do not limit the invention in any manner.

EXAMPLE I.—PREPARATION OF 2,3-DIMETHOXY-10-AMINO-BERBINE (I, Z'=NH$_2$)

Step A.—2-carboxy-4-nitro-N-[β-(3',4'-dimethoxyphenyl)-ethyl]-phenylacetamide, III 4.2 gm. of 4-nitro-homophthalic anhydride, II (product described by Whitmore et al., J. Am. Chem. Soc., 66, page 1237, [1944]) were introduced into 170 cc. of benzene. The mixture was heated at reflux until dissolved.

Next, over a period of 20 minutes, a solution of 4 gm. of homoveratrylamine (or 3,4-dimethoxy-phenethylamine) in 10 cc. of benzene was added to the reaction mixture, which was maintained at reflux for 1 hour following this addition.

The reaction mixture was cooled and the precipitate was vacuum filtered, washed with benzene and dried at a temperature of 80° C. After recrystallization from methanol, 5.46 gm., a yield of 68%, of 2-carboxy-4-nitro-N-[β-(3',4'-dimethoxy-phenyl)-ethyl]-phenylacetamide, III, were obtained, having a melting point of 162° C.

The product occurred in the form of colorless needles, insoluble in water, ether and benzene, slightly soluble in alcohol and soluble in dilute aqueous alkalis, acetone and chloroform.

*Analysis.*—C$_{19}$H$_{20}$O$_7$N$_2$; molecular weight=388.37. Calculated: C, 58.76%; H, 5.19%; I, 7.21%. Found: C, 59.0%; H, 5.3%; 7.2%.

This compound is not described in the literature.

Step B.—2-carbomethoxy-4-nitro-N-[β-(3',4'-dimethoxyphenyl)-ethyl]-phenylacetamide, IV 12.5 gm. of 2-carboxy-4-nitro-N-[β-(3',4'-dimethoxyphenyl)-ethyl]-phenylacetamide, III, were introduced into 60 cc. of methylene chloride. The reaction mixture was cooled to about 0° C., then, dropwise, a solution of diazomethane in methylene chloride was added and the reaction mixture was agitated for 20 minutes at room temperature.

The excess diazomethane was destroyed by adding 0.2 cc. of acetic acid. The methylene chloride was distilled and the residue was crystallized from ethyl acetate. The mixture was iced. The precipitate was vacuum filtered, washed with a mixture of ethyl acetate and ether (4:6) and dried at 80° C. 11.4 gm. of 2-carbomethoxy-4-nitro-N-[β-(3',4'-dimethoxy-phenyl)-ethyl]-phenylacetamide, IV, were obtained, having a melting point of 126° C.

The product occurred in the form of needles, insoluble in water, dilute aqueous alkalis and ether, and soluble in alcohol, acetone and chloroform.

*Analysis.*—C$_{20}$H$_{22}$O$_7$N$_2$; molecular weight=402.39. Calculated: C, 59.69%; H, 5.51%; N, 6.96%. Found: C, 59.7%; H, 5.6%; N, 7.0%.

This compound is not described in the literature.

It is also possible to obtain 2-carbomethoxy-4-nitro-N-[β-(3',4'-dimethoxy-phenyl)-ethyl]-phenylacetamide, IV, by working in the following manner:

12 gm. of 2-carboxy-4-nitro-N-[β-(3',4'-dimethoxyphenyl)-ethyl]-phenylacetamide, III, were introduced into 60 cc. of methanol containing 5% of concentrated sulfuric acid. The reaction mixture was heated at reflux for two and a half hours.

Thereafter the reaction mixture was cooled, iced and vacuum filtered. The product obtained was recrystallized from 14 volumes of ethyl acetate to obtain 2-carbomethoxy-4-nitro-N-[β-(3',4'-dimethoxy-phenyl)-ethyl]-phenylacetamide, IV, in a second crystalline form. The melting point was in this case 138° C.

Step C.—2,3-dimethoxy-8-oxo-10-nitro-13-dehydroberbine, V 24.5 gm. of 2-carbomethoxy-4-nitro-N-[β-(3',4'-dimethoxy-phenyl)-ethyl]-phenylacetamide, IV, were introduced into 125 cc. of anhydrous phosphorus oxychloride. The reaction mixture was agitated for ½ hour at 80° C. Thereafter the solution obtained was allowed to stand for 15 hours at a temperature of 25-30° C.; then the solution was poured into ice water and left in contact for 1 hour.

The reaction mixture was adjusted to a pH value of 9 by the addition of ammonia. The precipitate was filtered and taken up in chloroform. The solution was concentrated to a small volume, then ether was added thereto. The product was vacuum filtered, washed with ether and dried at 80° C.

The product obtained was recrystallized from dimethylformamide heated to reflux. By cooling, 18 gm., that is a yield of 80%, of 2,3-dimethoxy-8-oxo-10-nitro-13-dehydro-berbine, V, were obtained, having a melting point of 300 to 305° C.

The product occurred in the form of prismatic crystals, insoluble in water, alcohol and ether, and slightly soluble in acetone and benzene.

*Analysis.*—C$_{19}$H$_{16}$O$_5$N$_2$; molecular weight=352.33. Calculated: C, 64.77%; H, 4.58%; N, 7.95%. Found: C, 65.1%; H, 4.6%; N, 7.8%.

This compound is not described in the literature.

Step D.—2,3-dimethoxy-10-amino-13-dehydro-berbine, VI

At a temperature of 0° C. and under agitation in nitrogen atmosphere, 5.3 gm. of lithium aluminum hydride were introduced into 220 cc. of anhydrous tetrahydrofuran, then 5.3 gm. of aluminum chloride were added thereto.

Next, within a half hour, 5.3 gm. of 2,3-dimethoxy-8-oxo-10-nitro-13-dehydro-berbine, V, were added to the reaction mixture. The agitation was continued for one and a half hours at room temperature and terminated by heating the reaction mixture for 20 minutes at reflux.

The reaction mixture was cooled to about 0° C. and the excess reactant was destroyed by the addition of tetrahydrofuran containing 20% of water.

The precipitate was vacuum filtered and washed with tetrahydrofuran. The combined filtrates were distilled to dryness under vacuum to obtain 2,3-dimethoxy-10-amino-13-dehydro berbine, VI. This product was utilized as such for the next step of the synthesis.

Step E.—2,3-dimethoxy-10-amino-berbine (I, Z'=—NH$_2$)

2,3-dimethoxy-10-amino-13-dehydro berbine, VI, as prepared in the preceding step, was dissolved in 27 cc. of ethanol containing 15% of water. 2.7 gm. of potassium borohydride were added and the solution was heated at reflux for 2 hours. The reaction mixture was then cooled to room temperature, poured into ice water and extracted with methylene chloride.

The organic phase was recovered, dried and distilled to dryness under vacuum. The residue obtained was crystallized by dissolving in ethyl acetate, adding ether and icing, then the crystallized residue was vacuum filtered and the crystals were washed with ether. 2.21 gm., a yield of 53%, of 2,3-dimethoxy-10-amino-berbine (I, Z'=—NH$_2$) were obtained with a melting point of 166° C.

The product occurred in the form of crystals, slightly soluble in ether, and soluble in alcohol, acetone and chloroform.

Analysis.—C$_{19}$H$_{22}$O$_2$N$_2$; molecular weight=310.38. Calculated: C, 73.52%; H, 7.14%; N, 9.03%. Found: C, 73.3%; H, 7.1%; N, 9.0%.

This compound is not described in the literature.

On resolving, dextrorotatory 2,3-dimethoxy-10-amino-berbine had a melting point of 196° C. with a specific rotation $[\alpha]_D^{20}$=+331° (c.=0.6% in ethanol) and levorotatory 2,3-dimethoxy-10-amino-berbine had a melting point of 196° C. with a specific rotation $[\alpha]_D^{20}$=—327° C. (c.=0.5% in ethanol).

EXAMPLE II

The 2,3-dimethoxy-10-amino-berbine (I, Z'=—NH$_2$), may also be prepared by starting with 2-carbomethoxy-4-nitro - N-[β-(3',4'-dimethoxy-phenyl)-ethyl]-phenylacetamide, IV, in the following manner:

Step A.—2-hydroxymethyl-4-nitro-N-]β-(3',4'-dimethoxyphenyl)-ethyl]-phenylacetamide, VII At room temperature, 0.3 gm. of potassium borohydride and 0.25 gm. of lithium chloride were placed in suspension in 10 cc. of anhydrous tetrahydrofuran. Next, 0.5 gm. of 2 - carbomethoxy-4-nitro-N-[β-(3',4'-dimethoxy-phenyl)-ethyl]-phenylacetamide, IV (prepared according to Example I, Step B), was added to the suspension and the reaction mixture was agitated for 2 hours.

Thereafter the reaction mixture was poured over ice and extracted with methylene chloride. The organic phase was recovered and washed first with normal hydrochloric acid, then with water. The washed organic phase was then dried and the methylene chloride was eliminated by distillation. The residue obtained was crystallized from 5 cc. of an ethyl acetate-ether mixture (4:6) to obtain 0.23 gm. of 2 - hydroxymethyl-4-nitro-N-[β-(3',4'-dimethoxy-phenyl)-ethyl]-phenylacetamide, VII, having a melting point of 125° C. or a melting point of 146 to 148° C. according to the crystalline form obtained.

The product occurred in the form of brick-colored crystals.

Analysis.—C$_{19}$H$_{22}$O$_6$N$_2$; molecular weight=374.38. Calculated: C, 60.95%; H, 5.92%; N, 7.48%. Found: C, 61.2%; H, 6.0%; N, 7.3%.

This compound is not described in the literature.

Step B.—2,3-dimethoxy-10-nitro-berbine, VIII (a) Cyclization.—One part of 2-hydroxymethyl-4-nitro-N-[β-(3',4'-dimethoxy-phenyl) - ethyl] - phenylacetamide, VII, was added to a mixture composed of 20 volumes of benzene and 2 volumes of phosphorus oxychloride. The reaction mixture was heated at reflux for 2 hours. Thereafter the reaction mixture was poured over ice, left in contact for 1 hour and then extracted with methylene chloride.

The organic phase was recovered, washed with water, dried and distilled to dryness under vacuum, thus obtaining a resin.

(b) Reduction.—The resin obtained above was dissolved in 10 volumes of 85% alcohol and one part by weight of potassium borohydride by weight of the resin was added thereto. The reaction mixture was agitated at room temperature for 3 hours. The mixture was then diluted by adding 50 parts of water and finally extracted with methylene chloride. The organic phase was recovered, washed with water, dried and distilled to dryness under vacuum. 2,3-dimethoxy-10-nitro-berbine, VIII, was obtained, which was utilized as such for the next step of the synthesis.

This compound is not described in the literature.

Step C.—2,3-dimethoxy-10-amino-berbine (I, Z'=—NH$_2$)

One part of 2,3-dimethoxy-10-nitro-berbine, VIII, was introduced into 10 volumes of acetic acid, 3 parts of zinc powder were added thereto, and the reaction mixture was refluxed for ¼ hour.

Thereafter the reaction mixture was cooled to room temperature, vacuum filtered and the filter was washed with acetic acid. The filtrate was diluted with 50 parts of water and neutralized with the addition of ammonia. Thereafter, the filtrate was extracted with methylene chloride. The organic phase was recovered, washed with water, dried and distilled to dryness under vacuum.

The residue was crystallized from 10 volumes of a mixture of ethyl acetate-ether (4:6) to give 2,3-dimethoxy-10-amino-berbine (I, Z'=—NH$_2$).

EXAMPLE III.—PREPARATION OF 2,3-DIMETHOXY-10-DIMETHYLAMINO-BERBINE

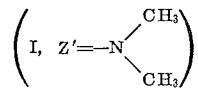

Under agitation at room temperature, 0.96 gm. of 2,3-dimethoxy - 10 - amino-berbine (I, Z'≡—NH$_2$), was introduced into 10 cc. of a 40% formaldehyde solution. 2 gm. of zinc powder and 10 cc. of acetic acid were added thereto. The reaction mixture was then agitated for three and a half hours. The reaction mixture was vacuum filtered and the filter was washed with acetic acid and with water.

The filtrate was neutralized to a pH value of 10 by addition of a sodium hydroxide solution and then extracted with methylene chloride. The organic phase was washed with water, dried and distilled to dryness under vacuum.

The residue was crystallized from isopropyl ether, yielding 0.69 gm. (66%) of 2,3-dimethoxy-10-dimethylamino-berbine

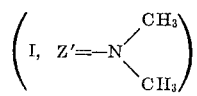

having a melting point of 90 to 92° C.

The product occurred in the form of small rods, insoluble in water, slightly soluble in ether, and soluble in alcohol, acetone, benzene and chloroform.

*Analysis.*—$C_{21}H_{26}O_2N_2$; molecular weight=338.43. Calculated: C, 74.52%; H, 7.74%; N, 8.28%. Found: C, 74.7%; H, 7.9%; N, 8.3%.

This compound is not described in the literature.

EXAMPLE IV.—PREPARATION OF 2,3-DIMETHOXY-10-HYDROXY-BERBINE (I, 6′=—OH)

At a temperature of about 0° C., 2.79 gm. of 2,3-dimethoxy - 10 - amino - berbine (I, Z′=—$NH_2$) were added to 56 cc. of 5 N hydrochloric acid. Within a period of 15 minutes a solution of 0.56 gm. of sodium nitrite in 28 cc. of water was added and the reaction mixture was allowed to stand for a half hour at a low temperature. Thereafter it was heated for a half hour at a temperature of 85 to 90° C., then cooled and adjusted to a pH value of 10 by addition of ammonia while maintaining a low temperature.

The reaction mixture was extracted with methylene chloride. The organic phase was washed with a normal sodium hydroxide solution, 10 N hydrochloric acid was added thereto until a pH value of 1 was obtained, then the mixture was neutralized by adding ammonia thereto.

The mixture was again extracted with methylene chloride, the organic phase was washed with water, dried and concentrated to a small volume. 50 cc. of ether was added and the solution was distilled to half the volume, then iced. The precipitate was vacuum filtered and dried at 80° C. In this manner 1.44 gm., a yield of 50%, of 2,3-dimethoxy - 10 - hydroxy-berbine (I, Z′=—OH) were obtained, having a melting point of 260° C.

The product was insoluble in ether, slightly soluble in acetone, benzene, alcohol and chloroform.

*Analysis.*—$C_{19}H_{21}O_3N$; molecular weight=311.37. Calculated: C, 73.29%; H, 6.80%; N, 4.50%. Found: C, 73.1%; H, 6.8%; N, 4.8%.

This compound is not described in the literature.

On resolving, dextrorotatory 2,3-dimethoxy-10-hydroxy-berbine had a melting point of 270° C. and a specific rotation $[\alpha]_D^{20}=+379°$ (c.=0.6% in pyridine), and levorotatory 2,3 - dimethoxy - 10 - hydroxy-berbine had a melting point of 270° C. and a specific rotation $$[\alpha]_D^{20}=-384°$$

(c.=0.8% in pyridine).

EXAMPLE V.—PREPARATION OF 2,3 - DIMETHOXY-10-ACETOXY-BERBINE (I, Z′=—$OOCH_3$)

100 mg. of 2,3-dimethoxy-10-hydroxy-berbine (I, Z′=—OH) were placed in suspension in 0.2 cc. of pyridine. 0.1 cc. of acetic acid anhydride were added thereto at room temperature and, after dissolution, the reaction mixture was allowed to rest for 1 hour. Next, water was added, the reaction mixture was left in contact for 30 minutes and then adjusted to a pH value of 10 by adding triethylamine. The precipitate formed was vacuum filtered, washed with water and dried. The product had a melting point of ~90° C.

After recrystallization from isopropyl ether, 30 mg. of 2,3 - dimethoxy - 10 - acetoxy-berbine (I, Z′=—$OOCCH_3$)

were obtained, having a melting point of about 100° C.

This compound is not described in the literature.

EXAMPLE VI.—PREPARATION OF 2,3 - DIMETHOXY - 10 - (3′,4′,5′ - TRIMETHOXY-BENZOYLOXY)BERBINE

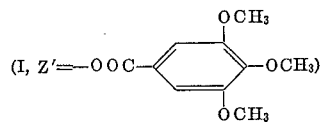

175 mg. of 2,3-dimethoxy-10-hydroxy-berbine (I, Z′=—OH) were placed in suspension in 0.7 cc. of pyridine and heated at about 50° C. until completely dissolved. After the solution was returned to room temperature, 115 mg. of 3,4,5-trimethoxy-benzoyl chloride were added thereto and, after being dissolved, the reaction mixture was allowed to stand for 1 hour. Next, water was added, the reaction mixture was adjusted to a pH value of 10 by adding triethylamine and cooled. The precipitate formed was vacuum filtered, washed with water and dried.

After recrystallization from isopropanol, 178 mg. of 2,3-dimethoxy - 10-(3′,4′,5′-trimethoxy-benzoyloxy)-berbine

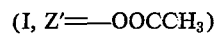
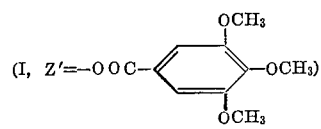

were obtained, having a melting point of 142° C.

This compound is not described in the literature.

EXAMPLE VII.—PREPARATION OF 2,3,10-TRIMETHOXY-BERBINE (I, Z′=$OCH_3$)

1.44 gm. of 2,3-dimethoxy-10-hydroxy-berbine (I, Z′=—OH) were introduced into 30 cc. of a mixture of methylene chloride-methanol (1:1). At room temperature, in the space of 15 minutes, 35 cc. of a 2% solution of diazomethane in methylene chloride were added and the reaction mixture was allowed to rest for 1 hour. The excess diazomethane was destroyed by the addition of acetic acid. The organic mixture was washed with a normal sodium hydroxide solution and extracted with methylene chloride.

The organic phase was dried, distilled to dryness under vacuum and the residue was recrystallized from isopropyl ether. 1.23 gm., a yield of 82%, of 2,3,10-trimethoxyberbine (I, Z′=—$OCH_3$) was obtained having a melting point of 118° C.

The product occurred in the form of small rods, soluble in alcohol, ether, acetone, benzene and chloroform.

*Analysis.*—$C_{20}H_{23}O_3N$; molecular weight=325.39. Calculated: C, 73.82%; H, 7.12%; N, 4.30%. Found: C, 73.6%; H, 7.2%; N, 4.3%.

The hydrochloride of 2,3,10-trimethoxy-berbine is described by Bradsher, J. Org. Chem. 26, 2231 (1961).

On resolving, dextrorotatory 2,3,10-trimethoxy-berbine had a melting point of 144 to 146° C. and a specific rotation $[\alpha]_D^{20}=+312°\pm2$ (c.=1% in ethanol), and levorotatory 2,3,10-trimethoxy-berbine had a melting point of 144 to 146° C., and a specific rotation $$[\alpha]_D^{20}=-325°\pm5$$

(c.=0.6% in ethanol).

EXAMPLE VIII.—PREPARATION OF 2,3-DIMETHOXY-10-CHLORO-BERBINE (I, Z′=—Cl)

1 gm. of 2,3 - dimethoxy - 10 - amino-berbine (I, Z′=—$NH_2$) was introduced into 20 cc. of a 5 N hydrochloric acid solution. The reaction mixture was cooled to a temperature of 0° C. In the space of 10 minutes, a solution of 0.2 gm. of sodium nitrite in 10 cc. of water was added thereto and the reaction mixture was allowed to stand for a half hour. Next, dropwise, a solution of 1 gm. of cuprous chloride in 10 cc. of a 5 N hydrochloric acid solution was added and the reaction mixture was left standing for 2 hours at room temperature.

Thereafter the reaction mixture was poured into water, adjusted to a pH value of 10 by adding ammonia and extracted with methylene chloride. The organic phase was washed with water, dried and distilled to dryness under vacuum.

After the residue was recrystallized from isopropyl ether, 0.65 gm. of 2,3-dimethoxy-10-chloro-berbine (I, Z′=—Cl), were obtained.

The product occurred in the form of prisms, insoluble in water and soluble in ether, alcohol, acetone, benzene and chloroform.

Analysis.—$C_{19}H_{20}O_2NCl$; molecular weight=329.82. Calculated: C, 69.19%; H, 6.11%; N, 4.25%; Cl, 10.75%. Found: C, 69.1%; H, 6.2%; N, 4.1%; Cl, 11%.

This compound is not described in the literature.

EXAMPLE IX. — PREPARATION OF 2,3-DIMETHOXY-10-ACETYLAMINO (I, Z'=—NHCOCH$_3$)

2.5 gm. of 2,3 - dimethoxy - 10 - amino-berbine (I, Z'=—NH$_2$) were placed in suspension in 3.75 cc. of pyridine. 2.5 cc. of acetic acid anhydride were added to the suspension and the temperature was maintained below 30° C. by means of a water bath. A crystalline mass was formed which was mixed with water at room temperature until it was completely dissolved. The solution was neutralized by the addition of triethylamine. The precipitate formed was vacuum filtered, washed with water and recrystallized from acetone. 2.5 gm. of 2,3-dimethoxy-10-acetylamino-berbine (I, Z'=—NHCOCH$_3$) were obtained having a melting point of 196° C.

The product was insoluble in water and ether, very slightly soluble in benzene, slightly soluble in alcohol and soluble in acetone and chloroform.

Analysis.—$C_{21}H_{24}O_3N_2$; molecular weight=352.43. Calculated: C, 71.57%; H, 6.86%; N, 7.95%. Found: C, 71.4%; H, 7.0%; N, 8.0%.

This compound is not described in the literature.

On resolving, dextrorotatory 2,3-dimethoxy-10-acetyl-amino-berbine had a melting point of 164 to 166° C., and a specific rotation $[\alpha]_D^{20}=+294°$ (c.=0.85% in ethanol), and levorotatory 2,3 - dimethoxy - 10 - acetylamino-berbine had a melting point of 164 to 166° C., and a specific rotation $[\alpha]_D^{20}=-302°$ (c.=1% in ethanol).

EXAMPLE X.—PREPARATION OF 2,3 - DIMETHOXY - 10 - FORMYLAMINO - BERBINE (I, Z'=—NHCOH)

4. gm. of 2,3 - dimethoxy - 10 - amino - berbine (I, Z'=—NH$_2$) were dissolved in 8 cc. of formic acid and heated at reflux for 30 minutes. Next, ice water was added, the solution was adjusted to a pH of 10 by an addition of concentrated ammonia, and extracted with methylene chloride. The extracts were washed with water, dried over sodium sulfate and evaporated to dryness in vacuo. By recrystallization of the residue from ethyl acetate, 3.7 gm. of 2,3 - dimethoxy - 10 - formylamino - berbine (I, Z'=—NHCOH) were obtained, crystallized in the form of prisms and having a melting point of 196° C.

Analysis.—$C_{20}H_{22}O_3N_2$; molecular weight=338.39. Calculated: C, 70.98%; H, 6.55%; N, 8.28%. Found: C, 71.1%; H, 6.5%; N, 8.3%.

This compound is not described in the literature.

EXAMPLE XI.—PREPARATION OF 2,3 - DIMETHOXY - 10 - METHYLAMINO - BERBINE (I, Z'=—NHCH$_3$)

50 cc. of tetrahydrofuran and 1.25 gm. of lithium aluminum hydride were introduced into a flask. Then, in small fractions, 2.5 gm. of 2,3-dimethoxy-10-formyl-amino-berbine (I, Z'=—NHCOH) were added. The mixture was heated at reflux for one hour, then cooled and slowly, while agitating, 15 cc. of tetrahydrofuran containing 20% of water were added. Next, the reaction mixture was filtered, and the filtrate was distilled to dryness in vacuo.

By recrystallization from ether, 1.8 gm. of 2,3-dimethoxy-10-methylamino-berbine (I, Z'=—NHCH$_3$) were obtained. The product had a melting point of 136° C.

Analysis.—$C_{20}H_{24}O_2N_2$; molecular weight=324.41. Calculated: C, 74.04%; H, 7.46%; N, 8.64%. Found: C, 74.3%; H, 7.4%; N, 8.8%.

This compound is not described in the literature.

EXAMPLE XII.—PREPARATION OF 2,3 - DIMETHOXY - 10 - ETHYLAMINO - BERBINE (I, Z'=—NHC$_2$H$_5$)

Under an inert atmosphere, first 30 cc. of tetrahydrofuran, then 1 gm. of lithium aluminum hydride were introduced into a flask. Next, in small fractions, 2 gm. of 2,3 - dimethoxy - 10 - acetylamino - berbine (I, Z'=NHCOCH$_3$) were added. The reaction mixture was heated at reflux for one hour, cooled in an ice-methanol bath, then the excess of the reactant was destroyed by slow addition of 20 cc. of tetrahydrofuran containing 10% of water. The mixture was then filtered and the filtrate was distilled to dryness in vacuo. The residue was dissolved in 100 cc. of ether and subjected to chromatography through 4 gm. of magnesium silicate. By elution with ether, evaporation of the eluates and crystallization in isopropylic ether, 1.67 gm. of 2,3-dimethoxy-10-ethylamino-berbine (I, Z'=—NHC$_2$H$_5$) were obtained, having a melting point of 120° C.

Analysis.—$C_{21}H_{26}O_2N_2$; molecular weight=338.44. Calculated: C, 74.52%; H, 7.74%; N, 8.28%. Found: C, 74.3%; H, 7.6%; N, 8.4%.

This compound is not described in the literature.

EXAMPLE XIII.—PREPARATION OF 2,3 - DIMETHOXY - 10 - N - ETHYL - N - ACETYLAMINO-BERBINE

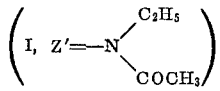

2.5 gm. of 2,3-dimethoxy-10-ethylamino-berbine (I, Z'=—NHC$_2$H$_5$) were dissolved in 5 cc. of acetic acid anhydride. The mixture was agitated for 2 hours at room temperature, then allowed to stand for 48 hours. Thereafter, 55 cc. of water were added. The mixture was agitated for one hour at room temperature, then cooled in an ice bath and ammonia was added until an alkaline pH was obtained. The reaction mixture was then extracted with methylene chloride and the extracts were washed with water, dried over magnesium sulfate and distilled to dryness in vacuo. The residue was dissolved in a minimum quantity of ether and crystallized by concentration. In this manner, 2.67 gm. of 2,3-dimethoxy-10-N-ethyl-N-acetyl-amino-berbine

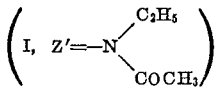

were obtained, with a melting point of 145° C.

Analysis.—$C_{23}H_{28}O_3N_2$; molecular weight=380.47. Calculated: C, 72.60%; H, 7.42%; N, 7.36%. Found: C, 72.4%; H, 7.4%; N, 7.3%.

This compound is not described in the literature.

EXAMPLE XIV.—PREPARATION OF 2,3 - DIMETHOXY-10-DIETHYLAMINO-BERBINE

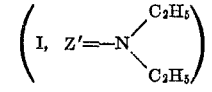

In an inert atmosphere, first 40 cc. of tetrahydrofuran, then 1.34 gm. of lithium aluminum hydride were introduced into a flask, by small fractions. Then, progressively 2.67 gm. of 2,3-dimethoxy-10-N-ethyl-N-acetyl-amino-berbine

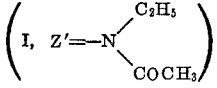

were added and the mixture was heated for 2 hours at reflux. Next, the mixture was cooled in an ice-methanol bath and slowly 30 cc. of tetrahydrofuran containing 20% of water were added. The reaction mixture was filtered. The filtrate was distilled to dryness in vacuo. The resultant residue was dissolved in ether and subjected to chromatography through 7 gm. of magnesium silicate. By elution with ether and concentration to dryness of the eluates, 2.35 gm. of 2,3-dimethoxy-10-diethylamino-berbine

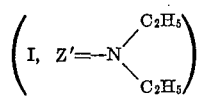

were obtained, having a melting point of about 50° C.

*Analysis.*—$C_{23}H_{30}O_2N_2$; molecular weight = 366.49. Calculated: C, 75.37%; H, 8.25%; N, 7.64%. Found: C, 75.2%; H, 8.2%; N, 7.9%.

This compound is not described in the literature.

EXAMPLE XV.—PREPARATION of 2,3 - DIMETHOXY-10-CYANO-BERBINE (I, Z'=—C≡N)

(a) *Preparation of the reactant.*—12 gm. of cupric sulfate, solvated with $5H_2O$, were dissolved in 18 cc. of water and 25 cc. of concentrated ammonia. The mixture was cooled to a temperature of +8° C. and then dropwise, 12.5 gm. of potassium cyanide in a solution of 18.5 cc. of water were introduced therein.

(b) *Gatterman reaction.*—5 gm. of 2,3-dimethoxy-10-amino-berbine (I, Z'=—$NH_2$) were dissolved in 50 cc. of water and 5 cc. of concentrated hydrochloric acid. The mixture was cooled to about 0° C. Then, dropwise, a solution of 1.1 gm. of sodium nitrite in 5 cc. of water were added. After agitating the mixture for 5 minutes, again dropwise, the reaction solution was introduced into the cuprocyanide complex solution previously prepared, while agitating at a temperature of about 5° C. to 10° C. After one hour of agitation at room temperature, the reaction solution was filtered and the precipitate was washed with methylene chloride. The filtrate was extracted with methylene chloride. The organic solutions were combined, dried over sodium sulfate and concentrated to dryness. The residue was dissolved in ether, subjected to chromatography through 15 gm. of magnesium silicate and eluted with ether. The eluates were concentrated until the crystallization started. The solution was cooled and the precipitate obtained was filtered. In this manner, 2.74 gm. of 2,3-dimethoxy-10-cyanoberbine (I, Z'=—C≡N) were obtained. The product had a melting point of 154° C.

*Analysis.*—$C_{20}H_{20}O_2N_2$; molecular weight = 320.38. Calculated: C, 74.97%; H, 6.29%; N, 8.74%. Found: C, 75.1%; H, 6.5%; N, 8.7%.

This compound is not described in the literature.

EXAMPLE XVI.—PREPARATION OF THE HYDROCHLORIDE OF 2,3 - DIMETHOXY-10-CARBOXY-BERBINE (I, Z'=—COOH)

75 cc. of concentrated hydrochloric acid were brought to reflux and 1.5 gm. of 2,3-dimethoxy-10-cyano-berbine (I, Z'=—C≡N) were introduced therein.

The mixture was maintained at reflux for 3 hours allowing a stream of gaseous hydrochloric acid to bubble therethrough. Then, the mixture was cooled to room temperature; the precipitate formed was filtered, washed with acetone and then dried.

Thus, 1.4 gm. of hydrochloride of 2,3-dimethoxy-10-carboxy-berbine (I, Z'=—COOH) were obtained, with a melting point of 270° C.

*Analysis.*—Calculated: C, 63.90%; H, 5.90%; N, 3.72%; Cl, 9.43%. Found: C, 63.7%; H, 6.1%; N, 3.9%; Cl, 9.3%.

This compound is not described in the literature.

EXAMPLE XVII. — PREPARATION OF 2,3 - DIMETHOXY - 10 - CARBOMETHOXY - BERBINE (I, Z=—$COOCH_3$)

In an inert atmosphere, the following ingredients were introduced into a flask: 4 gm. of 2,3-dimethoxy-10-cyano-berbine (I, Z'=—C≡N) and 80 cc. of methanol saturated with hydrochloric acid.

The mixture was heated at reflux for 3 hours, then cooled in an ice bath. Next, concentrated ammonia was added until the mixture was alkaline and the mixture was extracted with methylene chloride. The extracts were washed with water, dried over magnesium sulfate and distilled to dryness in vacuo. The residue was taken up in ether, subjected to chromatography through magnesium silicate and eluted with ether. The eluates were concentrated until crystallization commenced. Thereafter, the mixture was cooled. The precipitate was vacuum filtered and dried. 3.3 gm. of 2,3-dimethoxy-10-carbomethoxy-berbine (I, Z'=—$COOCH_3$) were obtained, having a melting point of 118° C.

*Analysis.*—$C_{21}H_{23}O_4N$; molecular weight = 353.40. Calculated: C, 71.37%; H, 6.56%; N, 3.96%. Found: C, 71.4%; H, 6.7%; N, 4.2%.

This compound is not described in the literature.

As it has been indicated in the preceding, the berbine derivatives of the general Formula I are endowed with interesting pharmacological properties. In particular, they possess an important tranquilizing and/or analgesic action. The novel compounds of Formula I where Z' is Z are endowed with an important tranquilizing action.

They may be utilized for the treatment of manic excitation, of acute psychoses, of confusional syndromes, of hyperemotivity, of anxiety and anguish, of functional disorders of organic character caused or increased by psychic tension, neuralgia and various algia in warm-blooded animals.

The 2,3-dimethoxy-berbines of the general Formula I an the novel compounds were Z'=Z are utilized by means of oral, subcutaneous or rectal administration.

They may be prepared in any pharmaceutical form such as solutions or suspensions, drinkable or injectable, made up in ampoules or in phials of multiple doses; in the form of tablets, coated tablets, wafers, gelatin-coated pills, pellets, syrups, drops or suppositories.

The useful dosology is controlled between 0.05 and 1.50 gm. per day or between about 1 mg./kg. to about 35 mg./kg. of body weight in warm-blooded animals as a function of the method of administration.

More particularly, the useful dosology is controlled between 50 and 500 mg. per day for 2,3-dimethoxy-10-amino-berbine and 2,3-dimethoxy-10-acetylamine-berbine, between 100 mg. and 1.50 gm. per day for 2,3-dimethoxy-10-dimethylamino-berbine and 2,3-dimethoxy-10-hydroxy-berbine, and between 20 and 250 mg. per day for the 2,3,10-trimethoxy berbine, in the adult, as a function of the method of administration.

The pharmaceutical forms such as drinkable or injectable solutions or suspensions, tablets, coated tablets, wafers, gelatin-coated pills, pellets, syrups, drops and suppositories are prepared according to the usual processes.

EXAMPLE XVIII.—PHARMACOLOGICAL STUDY OF 2,3-DIMETHOXY-10-SUBSTITUTED BERBINES (1) *Tranquilizing activity.*—The tranquilizing activity was determined by the test of the inclined plane. A cork plate, slanted at 70° in relation to the horizontal plane, was utilized, containing a metal rod secured horizontally close to its upper edge. A normal mouse deposited on the inclined plate at about 15 cm. below the rod climbed up the slope, after a short practice period, as far as the rod to arrive at a position of rest.

The animals were tested 15 minutes, 30 minutes, 45 minutes, one hour, one and a half hours, 2 hours, 2½ hours, 3 hours, 3½ hours and 4 hours after the administration of the product under study, and the number of mice which did not climb up the slope was noted for each dose.

The products were administered intraperitoneally, in an acid solution, to groups of 5 mice, at different doses. The maximum effect was obtained between 45 minutes and one and a half hours.

The graphic representation of the maximal effect obtained, measured in percent of the mice which did not ascend, as a function of the logarithm of the doses, permitted the determination of the 50% active dose ($DP_{50}$).

The following table summarizes the results obtained.

TABLE II

| Compound tested | $DP_{50}$ in mg./kg. | $DL_{50}$ in mg./kg. | $DL_{50}/DP_{50}$ |
|---|---|---|---|
| 2,3-dimethoxy-10-amino-berbine | 10 | 100 | 10 |
| 2,3-dimethoxy-10-dimethylamino-berbine | 35 | 200 | 6 |
| 2,3-dimethoxy-10-acetylamino-berbine | 10 | 75 | 7.5 |
| 2,3-dimethoxy-10-methylamino-berbine | 5 | 75 | 15 |
| 2,3-dimethoxy-10-carboxy-berbine | 10 | 150 | 15 |
| 2,3-dimethoxy-10-hydroxy-berbine | 30 | >500 | >17 |
| 2,3,10-trimethoxy-berbine | 1-2 | About 50 | 25–50 |
| Tetrahydropalmatine | 20 | 100 | 5 |

In another test, 2,3-dimethoxy-10-dimethylaminoberbine was administered orally. In this method, it was discovered that the 50% active dose ($DP_{50}$) was 15 mg./kg. and the $DL_{50}$ was 150 mg./kg., giving an index of 10.

Consequently, it was established that the products studied and, particularly those where $Z'=Z$, have a tranquilizing activity definitely superior to that of tetrahydropalmatine.

(2) *Analgesic activity.*—The analgesic activity was determined by the acetic acid test. The intraperitoneal injection of acetic acid causes in the mouse repeated movements of characteristic stretching and twisting which can persist over 6 hours. The analgesics prevented or suppressed this symptom, which, due to this fact, could be considered as the exteriorization of a diffuse abdominal pain.

A solution of 6 parts of acetic acid in 1000 parts of water containing 10% of gum arabic was utilized. The dose releasing the syndrome under these conditions was 0.01 cc./gm., that is, 60 mg./kg. of acetic acid. The products studied were administered orally one half hour prior to the intraperitoneal injection of acetic acid, the mice being without food or drink since the day before the experiment. For each dose and for the control animals, which are obligatorily utilized in each test, a group of 5 animals was utilized. The stretching motions were observed, recorded and counted for each mouse for 20 minutes, then added up for each group of 5.

It was observed that the 50% analgesic dose ($DA_{50}$) was as follows:

|  | mg./kg. |
|---|---|
| 2,3-dimethoxy-10-amino-berbine | 35 |
| 2,3-dimethoxy-10-dimethylamino-berbine | 15 |
| Tetrahydropalmatine | 50 |

The products under study have, consequently, an analgesic activity definitely stronger than that of tetrahydropalmatine.

(3) *Determination of the toxicity.*—The test for toxicity was conducted on mice of the Rockland strain, each animal weighing between 18 and 22 gm.

The studied products were administered intraperitoneally to groups of mice in suspension in an aqueous dispersive liquid at increasing doses. The animals were kept under observation for one week.

The 50% lethal dose ($DL_{50}$) for the compounds studied is reported in Table II.

(4) *Symptomatology.*—At weak doses, an abatement in the general activity was noted, followed by a certain torpor, which, with stronger doses, became a catatonoidal condition, characterized by akinesia and negativity (the animal resisted any movements imposed). The muscular tone was variable according to the doses.

The preceding specific embodiments are illustrative of the practice of the invention. It is to be understood, however, that other expedients known to those skilled in the art may be employed without departing from the spirit of the invention or the scope of the appended claims.

We claim:
1. A berbine compound selected from the group consisting of a berbine derivative of the formula

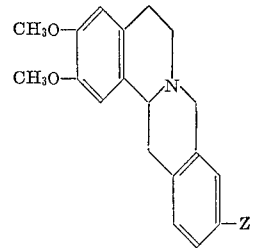

wherein Z is selected from the group consisting of

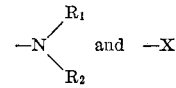

wherein $R_1$ is selected from the group consisting of hydrogen and alkyl having from 1 to 6 carbon atoms, $R_2$ is selected from the group consisting of hydrogen, alkyl having from 1 to 6 carbon atoms and an acyl of an organic carboxylic acid having from 1 to 12 carbon atoms, and X is selected from the group consisting of halogen having an atomic weight greater than 19, —C≡N and —$COOR_1$, its levorotatory and dextrorotatory enantiomorphs, and its pharmaceutically acceptable acid addition salts.

2. The compound of claim 1 wherein Z is —$NH_2$.
3. The compound of claim 1 wherein Z is

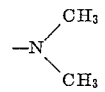

4. The compound of claim 1 wherein Z is

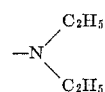

5. The compound of claim 1 wherein Z is

—$NHCOCH_3$

6. The compound of claim 1 wherein Z is —NHCOH.
7. The compound of claim 1 wherein Z is

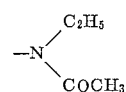

8. The compound of claim 1 wherein Z is —Cl.
9. The compound of claim 1 wherein Z is —$NHCH_3$.
10. The compound of claim 1 wherein Z is —$NHC_2H_5$.
11. The compound of claim 1 wherein Z is —C≡N.
12. The compound of claim 1 wherein Z is —COOH.
13. The compound of claim 1 wherein Z is —$COOCH_3$.
14. A process for the production of a berbine compound selected from the group consisting of a berbine derivative of the formula

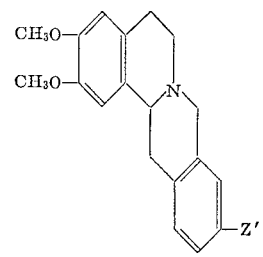

wherein Z' is a member selected from the group consisting of

—OR$_4$, and —X, wherein R$_4$ is selected from the group consisting of hydrogen, alkyl having from 1 to 6 carbon atoms and an acyl of an organic carboxylic acid having from 1 to 6 carbon atoms, R$_3$ is selected from the group consisting of hydrogen and alkyl having from 1 to 12 carbon atoms and X is selected from the group consisting of a halogen having an atomic weight greater than 19, —C≡N and —COOR$_3$; its levorotatory and dextrorotatory enantiomorphs; and its pharmaceutically acceptable acid addition salts, which comprises the steps of
  (a) condensing 4-nitro-homophthalic acid anhydride with 3,4-dimethoxy-phenethylamine in the presence of an organic solvent,
  (b) esterifying the carboxyl of the resulting 2-carboxy-4-nitro-N-[β-(3′,4′-dimethoxy-phenyl)-ethyl]-phenyl-acetamide with a lower alkyl and derived from the group consisting of lower alkanols and diaza lower alkanes under esterifying conditions,
  (c) cyclizing the resulting 2-carbo-lower-alkoxy-4-nitro-N-[β-(3′,4′-dimethoxy-phenyl)-ethyl]-phenylacetamide by treatment with phosphorus oxychloride,
  (d) reducing the resulting 2,3-dimethoxy-8-oxo-10-nitro-13-dehydro-berbine by treatment with lithium-aluminum hydride in the presence of an aluminum halide in an organic solvent,
  (e) reducing the double bond in the 13 position of the resulting 2,3-dimethoxy-10-amino-13-dehydro-berbine by treatment with an alkali metal borohydride in an aqueous alkanolic media, and
  (f) recovering said berbine compound.

15. The process of claim 14, step (f), wherein the resulting 2,3-dimethoxy-10-amino-berbine is reacted with formaldehyde in the presence of acetic acid and zinc and said berbine compound is recovered where Z′ is

16. The process of claim 14, step (f), wherein the resulting 2,3-dimethoxy-10-amino-berbine is reacted with nitrous acid and said berbine compound is recovered where Z′ is —OH.

17. The process of claim 14, step (f), wherein the resulting 2,3-dimethoxy-10-amino-berbine is reacted with nitrous acid and then with cuprous chloride and said berbine compound is recovered where Z′ is —Cl.

18. The process of claim 14, step (f), wherein the resulting 2,3-dimethoxy-10-amino-berbine is reacted with acetic acid anhydride in the presence of pyridine and said berbine compound is recovered wherein Z′ is
  —NHCOCH$_3$ 19. 2,3-dimethoxy-8-oxo-10-nitro-13-dehydroberbine.

20. 2,3-dimethoxy-10-amino-13-dehydro-berbine.

21. 2,3-dimethoxy-10-nitro-berbine.

References Cited

UNITED STATES PATENTS

| | | | |
|---|---|---|---|
| 3,103,513 | 9/1963 | Nauta | 260—283 |
| 3,272,707 | 9/1966 | Tedeschi | 260—289 X |
| 3,341,528 | 9/1967 | Shavel et al. | 260—289 X |

OTHER REFERENCES

Spath et al.: Ber., vol. 63, p. 3007 (1930).

ALEX MAZEL, *Primary Examiner.*

D. G. DANS, *Assistant Examiner.*

U.S. Cl. X.R.

260—281, 286, 520, 471, 558, 689, 343.2, 570.9, 236; 424—258